June 24, 1958

H. T. BRAZIER 2,840,099

WATER-LINE BREAKER

Filed Nov. 2, 1955

*INVENTOR:*
HALWORTH T. BRAZIER
BY
Rummler, Rummler & Snow
ATT'YS

United States Patent Office 2,840,099
Patented June 24, 1958

2,840,099

WATER-LINE BREAKER

Halworth T. Brazier, Chicago, Ill.

Application November 2, 1955, Serial No. 544,395

1 Claim. (Cl. 137—216)

This invention relates to water-line breakers such as are used for the connection from a main potable water supply line to an industrial surge tank or other reservoir, and more particularly to a water-line breaker wherein the inlet pipe leading from the main line cannot be flooded by water backing-up from the outlet pipe.

Although water-line breakers utilizing an air gap between the inlet and outlet ends thereof are conventional, they nevertheless do not insure against likelihood of contamination of the main potable water supply system which occurs when water from an industrial surge tank or the like backs up to flood the discharge end of the inlet pipe. Thus, the back-surge may be extensive enough to fill the housing of the water-line breaker to a level above the end of the inlet-pipe, and when this occurs, the separation between the inlet pipe and the outlet pipe cannot prevent a siphoning of contaminated water into the inlet pipe, as when there is a sudden reduction or loss of pressure in the supply main.

In the currently available line-breakers, the air-inlet or overflow outlets as may be provided for vacuum breaking purposes are located above the discharge end of the primary or inlet pipe, and therefore any back-surge will necessarily flood the inlet pipe opening before reaching an overflow level; or the overflow ports are only at the level of the discharge end itself so that sudden reduction of the pressure in the primary water supply system or the inlet pipe, with a simultaneous flooding of the inlet pipe opening, would cause contaminating fluids to be drawn into the potable water system to the detriment of other users thereof.

It is accordingly an object of the present invention to provide a water-line breaker having an inlet pipe or opening spaced a substantial fixed distance vertically from a secondary or outlet pipe opening coaxially thereof, the adjacent terminal portions of the inlet and outlet pipes being enclosed in a compartment or housing having air-inlet-overflow outlet parts extending for a predetermined distance below the discharge end of the primary or inlet pipe.

Another object of the invention is to provide a device of the type indicated wherein the total effective open area in the overflow ports, below the level of the discharge end of the inlet pipe and above the outlet pipe opening, is at least equal to several times the cross-sectional area of the inlet pipe, whereby any back-surge which may emanate from the secondary system or outlet pipe will be vented from the line-breaker housing before reaching the level of the inlet pipe opening to prevent contaminated water from being sucked into the main supply system.

Another object of the invention is to provide overflow openings or ports of the type indicated which are disposed substantially vertically in the housing wall, in the area of the air-gap, so that clogging from debris, dust and dirt will be substantially obviated.

Another object of the invention is to provide window openings or ports as described which are disposed on opposite sides of the housing, so that visual examination of the air-gap and water flow may be easily had.

Other objects and advantages will become apparent as the description proceeds in accordance with the drawings, in which:

Fig. 1 is a side elevational view of a water-line breaker according to the invention together with a surge tank or reservoir for use in industrial manufacturing or the like;

Figure 1:
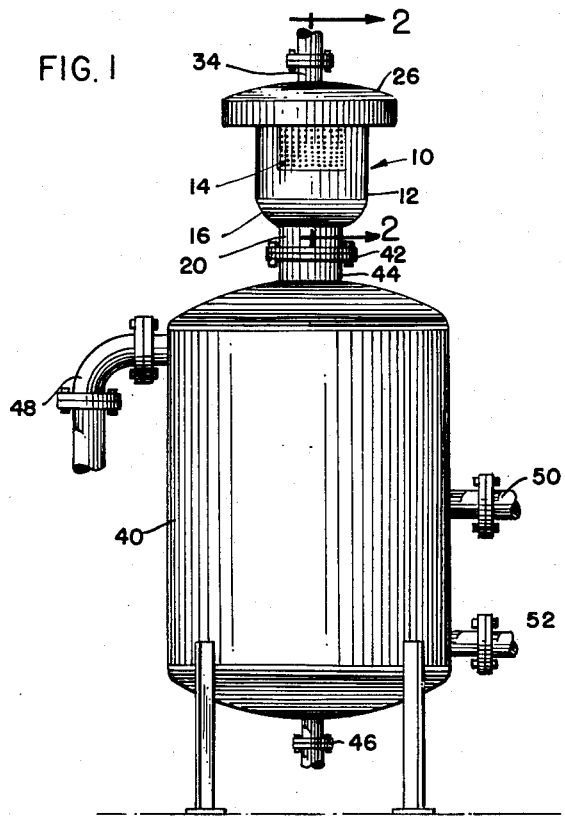

The water-line breaker 10 of the invention comprises an integrally formed metal compartment or housing body 12 having one or more screened air inlet and overflow openings or windows 14, a dished bottom bowl 16 welded to the lower edge 18 of the housing 12, an outlet pipe 20 whose inner end 22 is welded to the bottom bowl 16 around a central orifice 24 therein, a bell-like hood and deflector 26 welded to the upper edge 28 of the body and having a vertically depending flange 30 spaced outwardly from the body side-walls 32, and a primary or inlet pipe 34 fixedly welded in the hood 26 and extending downwardly therein in coaxial alignment with the outlet pipe 20.

The discharge end 36 of the inlet pipe 34 is spaced a substantial distance from the opening 24 of the outlet pipe, preferably by about six times the diameter of the inlet pipe, and the diameter of the outlet passage is preferably about three times the diameter of the inlet pipe passage. The 45° angular configuration of the discharge end 36, as shown, serves to prevent fanning-out or spreading of the inlet stream and to eliminate the need for a separate funnel means such as has heretofore been required for the outlet pipe, the dished configuration of the bottom 16 affording all the advantages of a funnel in any case.

The outlet pipe 20 communicates with a reservoir or surge tank 40 therebeneath, and is secured thereto by means of a suitable connection such as the flange connection 42 between the outlet pipe 20 and an upstanding conduit section 44 on the tank 40. The tank 40 is provided with a suitable drain connection 46 and overflow pipe 48 and has conduits 50 and 52 adapted to circulate water to the secondary water system (not shown) or to be pumped to an industrial site.

Figure 2:
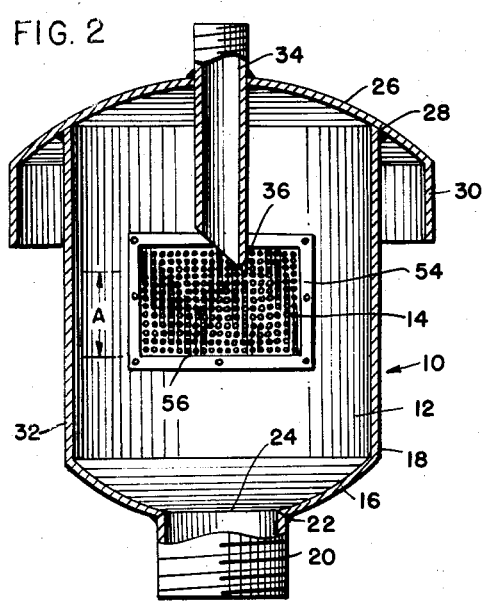
Fig. 2 is a vertical sectional view as taken along the line 2—2 of Fig. 1 of the water-line breaker of the invention.

Referring to Fig. 2, the air inlet-overflow ports or windows 14 may be covered by screens or perforated plates secured to the body 12 in any suitable manner, such as by the welded on frame 54 and are preferably of non-corrosive metal such as stainless steel or the like. In this connection, it is preferred that two such windows be disposed diametrically opposite each other in the housing to provide a view directly through the same for observation of the inlet stream. The windows are vertically disposed in the wall of the body 12, so that extraneous matter and debris will not lodge thereon, and they also serve to prevent such materials from entering the compartment. Also, the hood 26 functions to prevent falling dirt, dust, etc. from lodging on the screen or entering the compartment.

An essential to my invention is that the bottom edges 56 of the windows 14 be at least at a predetermined minimum distance below the discharge end 36 of the inlet pipe 34. This minimum distance, or vertical air-gap, has been determined to be twice the internal diameter of the discharge opening 36 and is indicated by the letter "A" in Fig. 2 of the drawings. Also, the net or effective overflow outlet area of the windows 14, below the discharge end 36 of the inlet or primary supply pipe 34, must be sufficient to pass, under a head less than the distance A, at least the quantity of water that would flow upwardly from the secondary system through the opening 24 at the maximum pressure that might occur in the secondary system. This is accomplished by variation of the horizontal width of the window according to the kind of screening employed and the maximum volume of water that must be provided for.

Where a sudden pressure reduction occurs in the inlet pipe 34, or a back surge under pressure in excess of that in the primary supply line occurs in the outlet pipe 20, it is possible with conventional water-line breakers for the water to rise over the discharge end 36, so that contaminated water may be sucked or pushed into the inlet pipe and thus enter the primary potable water system. However, the disposition of the windows 14 of adequate width in a position to extend at least the aforesaid minimum distance below the discharge end of the inlet pipe prevents such contamination, since air will either be sucked into the chamber to nullify the effect of a sudden pressure reduction in the primary system pipe 34, or water will overflow through the windows so as to prevent the back surge from reaching the level of the discharge opening.

As before mentioned, the combined area of the windows 14 below the level of the discharge opening 36, within the vertical distance A, should be such as to insure that the screen apertures therein have an effective discharge area, under a head less than twice the diameter of the primary pipe 34, sufficient to pass the maximum volume of water that may flood upwardly from the outlet opening 24. Under minimum conditions this area is preferably at least equal to five times the cross-sectional area of the inlet pipe 20 in order that there will be no possibility that the net amount of back-surge flow will exceed the flow capacity of the windows 14, because even the slightest amount of impurity or disease bearing materials in the main potable water system may represent a serious health hazard to an entire community. Consequently, for example, where a perforated or wire screen is used, it is preferred that the total gross window area be sufficient that the total effective area of the openings therein be at least the before mentioned minimum so that formation of a vacuum seal by back-surge around the inlet pipe is impossible; and in cases where a fine mesh screen is desired, because of conditions of extreme dust or air-borne material, the window size should be enlarged accordingly, the diameter of the housing 12 being increased as necessary to accommodate the necessary window size. Ordinarily a chamber diameter of six times the diameter of the inlet 36 will be sufficient, and in this connection it should be noted that by providing a primary inlet pipe having its outlet end cut-off at a 45° angle relative to the pipe axis, the discharged stream of water does not expand materially beyond the diameter of the inlet pipe and enters the outlet 24, as a confined column substantially without splashing or flooding so that the size of the chamber may be determined from the size requirements of the windows alone.

Preferably the minimum diameter for the outlet 24 from the housing 12 is approximately three times the diameter of the inlet 36, or such that the water discharged from the inlet will fall as a free stream into the opening 24 without flooding and with little or no splashing.

In the embodiment shown, the windows 14 are covered with screens made from perforated metal plates and in the ordinary case these plates are made with one-eighth inch perforations having three-sixteenths inch center to center spacing. Thus, the effective venting area is approximately 45% of the gross area of the window. In such a case the size of the gross area for each window, assuming an air gap height between the end of the inlet pipe and the bottom edge of the window of twice the inlet diameter and two windows being provided, will preferably be a height of approximately two and one-half times the inlet diameter and a width of approximately three times the inlet diameter. This will provide a certain safety factor in case some of the perforations should become clogged.

Figure 3:
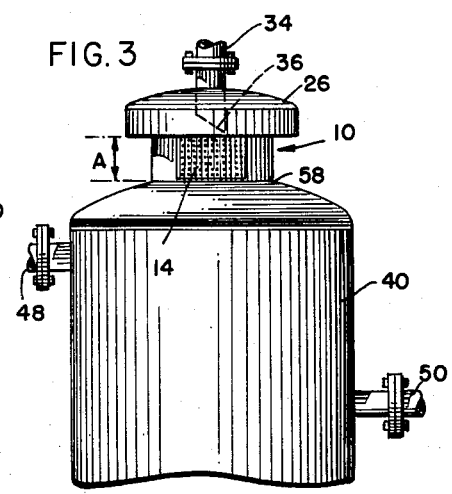
Fig. 3 is a side elevational view, partly broken away, of a second embodiment of the invention.

Referring now to Fig. 3, a second embodiment of the invention is shown wherein the vertical walls 32 of the housing or chamber 12 are joined directly to the top of a surge tank or reservoir 40, the juncture 58 between the compartment and the reservoir defining an outlet to the secondary system which is relatively wide as compared with that of the first embodiment. Not only does this construction afford substantial economies in manufacture, since the bottom wall 16, the outlet pipe 20 and the flanged connection 42 are eliminated, but it also provides for material conservation of space in those cases of rather large inlet pipe sizes. As in the case of the arrangement shown in Figs. 1 and 2, the minimum vertical air-gap height A, of at least twice the diameter of the inlet pipe outlet 36, is maintained between the outlet 36 and the bottom of the windows 14; and it will be appreciated that the effective area of the overflow openings or windows 14, below the level of the discharge end 36, must be sufficient to pass the maximum volume of water, at a head less than the height A, that might back-surge into the tank 40 and above the overflow outlet 48 in case the latter should for any reason be blocked.

In any case, my invention provides a water-line breaker which is very strong and dimensionally stable by virtue of the solid welded connection of the various component elements as described, so that the air-gap will always be positively fixed and of the required height, without the necessity of constant inspection and repair. The provision of overflow outlets well below the level of the discharge end of the inlet pipe prevents flow of contaminated water into the main supply system for potable water under all conditions, regardless of the suddenness of any pressure reduction in the inlet pipe or the force of back-surge into the outlet pipe from the secondary system. Consequently, the structure meets the exceedingly rigorous standards of large municipalities, in contrast to previous devices which have been deemed inadequate for the reasons hereinbefore set forth.

Although several embodiments of my invention have been herein shown and described, it will be understood that details of the constructions shown may be altered or omitted without departing from the spirit of my invention as defined by the following claim.

I claim:

A water-line breaker for industrial use comprising an inlet pipe, a vertically disposed cylindrical housing enclosing a downwardly discharging open end of said inlet pipe and having an outlet opening axially aligned with and spaced beneath said open end of said inlet pipe, the upper extremity of said cylindrical housing being provided with an axially apertured hood arranged to accommodate said inlet pipe, said housing having a diameter of at least six times the diameter of said inlet pipe, the lower extremity of said cylindrical housing being dished and having said axial outlet opening therein, said outlet having a diameter substantially three times the diameter of said inlet pipe but less than the area of said housing, said cylindrical housing being provided with at least one overflow opening arranged substantially medially therein, and having a total overflow discharge area of at least five times the area of said inlet pipe, the plane of the open end of said inlet pipe being at an angle of substantially forty-five degrees with the axis of said pipe with the lower extremity thereof terminating above the medial area of said cylindrical housing with the open end thereof directed away from the opening in said housing, and said inlet pipe being integrally attached to said housing wherefore its open end is in permanently fixed relation with said overflow opening.

References Cited in the file of this patent
UNITED STATES PATENTS

| | | |
|---|---|---|
| 756,517 | Miller | Apr. 5, 1904 |
| 2,047,163 | Cekal | July 7, 1936 |
| 2,250,974 | Stoddard | July 29, 1941 |
| 2,277,878 | Morris | Mar. 31, 1942 |
| 2,512,452 | Wilson | June 20, 1950 |
| 2,619,977 | Hagen | Dec. 2, 1952 |